(12) United States Patent
Igarashi

(10) Patent No.: US 10,498,381 B2
(45) Date of Patent: Dec. 3, 2019

(54) PROTECTIVE TOOL

(71) Applicant: POWER SUPPORT CO., LTD., Tokyo (JP)

(72) Inventor: Katsushi Igarashi, Tokyo (JP)

(73) Assignee: POWER SUPPORT CO., LTD., Tokyo (JP)

( * ) Notice: Subject to any disclaimer, the term of this patent is extended or adjusted under 35 U.S.C. 154(b) by 0 days.

(21) Appl. No.: 16/064,640

(22) PCT Filed: Dec. 22, 2016

(86) PCT No.: PCT/JP2016/088376
§ 371 (c)(1),
(2) Date: Jun. 21, 2018

(87) PCT Pub. No.: WO2017/111018
PCT Pub. Date: Jun. 29, 2017

(65) Prior Publication Data
US 2018/0375542 A1    Dec. 27, 2018

(30) Foreign Application Priority Data
Dec. 24, 2015 (JP) ................. 2015-251541

(51) Int. Cl.
*H04B 1/3888* (2015.01)
*A45C 13/00* (2006.01)
*A45C 11/00* (2006.01)

(52) U.S. Cl.
CPC ......... *H04B 1/3888* (2013.01); *A45C 13/002* (2013.01); *A45C 2011/002* (2013.01)

(58) Field of Classification Search
CPC ............... H04B 1/3888; A45C 13/002; A45C 2011/002; A45C 11/00; H04M 1/11; H04M 1/185
See application file for complete search history.

(56) References Cited

U.S. PATENT DOCUMENTS

2009/0237812 A1* 9/2009 Tseng ................. G02B 13/0055
                                                      359/808
2011/0228458 A1* 9/2011 Richardson ......... H04M 1/0252
                                                      361/679.01

(Continued)

FOREIGN PATENT DOCUMENTS

JP            3186391 U      10/2013
JP        2014-050011 A       3/2014

(Continued)

OTHER PUBLICATIONS

International Search Report dated Mar. 7, 2017 of corresponding application No. PCT/JP2016/088376; 2 pgs.

*Primary Examiner* — Dinh Nguyen
(74) *Attorney, Agent, or Firm* — Maier & Maier, PLLC

(57) ABSTRACT

Provided is a protector for a portable information terminal that protects the rear and front surfaces of the portable information terminal and whose entire volume is small.

A protector for protecting a portable information terminal includes a rear protector configured to protect a rear surface of the portable information terminal, a rear engagement portion disposed on the rear protector and configured to engage with the portable information terminal, a front protector extending from a side surface of the rear protector and configured to protect a front surface of the portable information terminal, and a front engagement portion disposed on the front protector and configured to engage with the rear engagement portion.

9 Claims, 10 Drawing Sheets

(56) References Cited

U.S. PATENT DOCUMENTS

| | | | |
|---|---|---|---|
| 2011/0266291 A1* | 11/2011 | Fan | H04B 1/3888 |
| | | | 220/669 |
| 2013/0042581 A1* | 2/2013 | Holben | H04B 1/3888 |
| | | | 53/473 |
| 2013/0165190 A1* | 6/2013 | Ko | H05K 5/03 |
| | | | 455/575.8 |
| 2014/0246355 A1* | 9/2014 | Azzoni | A45C 11/00 |
| | | | 206/776 |
| 2014/0360892 A1* | 12/2014 | Lin | A45C 11/00 |
| | | | 206/37 |

FOREIGN PATENT DOCUMENTS

| | | |
|---|---|---|
| JP | 2014-155135 A | 8/2014 |
| JP | 3198867 U | 7/2015 |
| JP | 3200537 U | 10/2015 |

\* cited by examiner

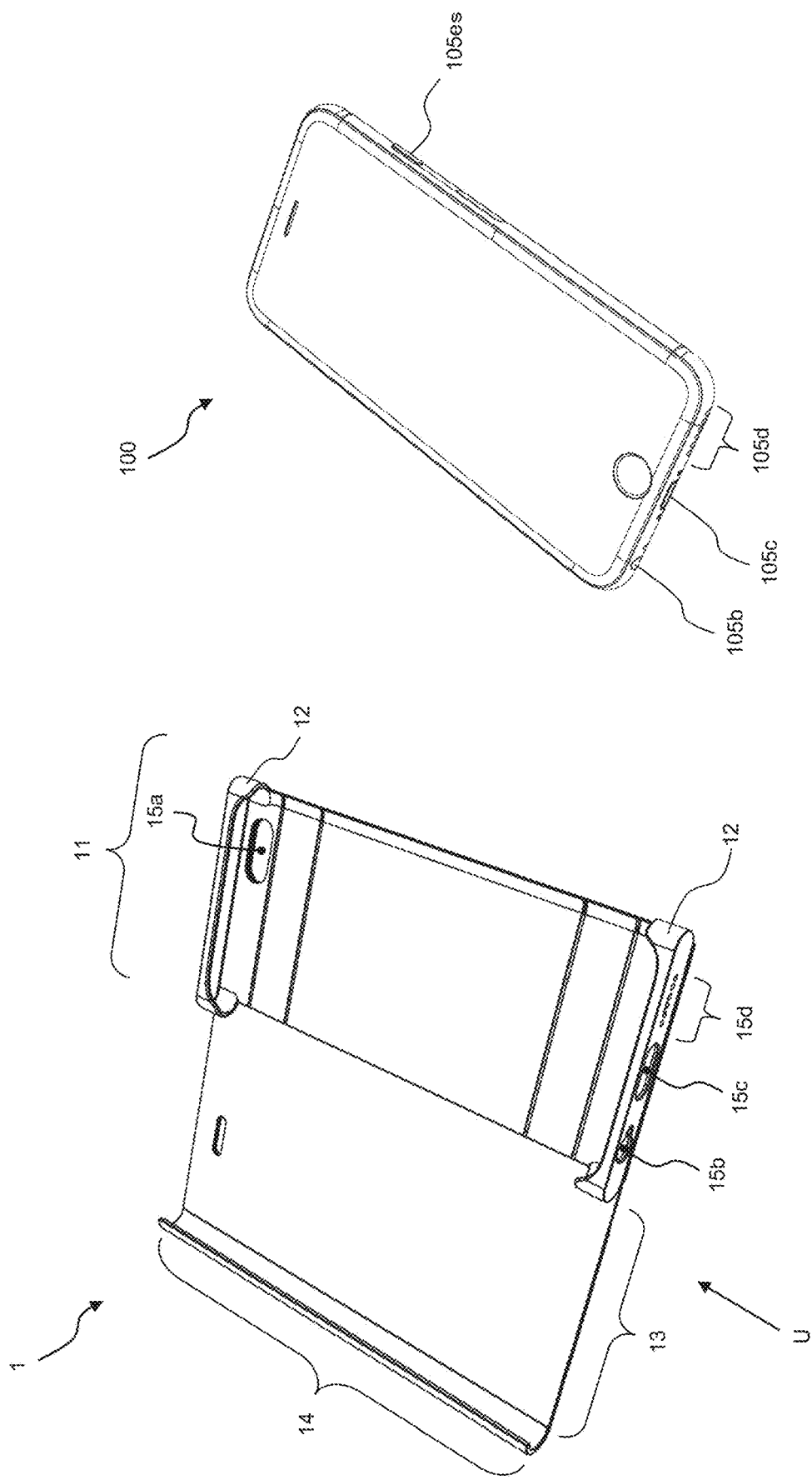

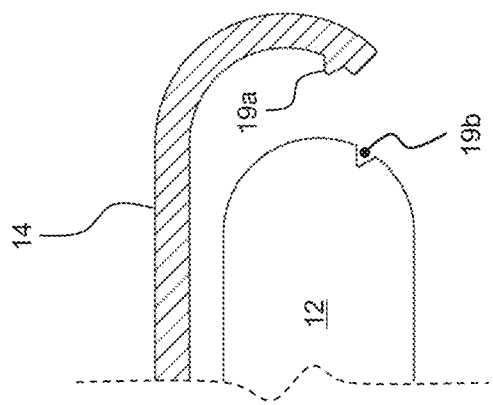
Fig.2E
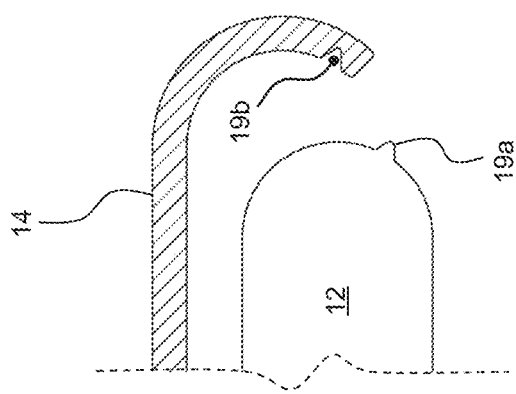
Fig.2F
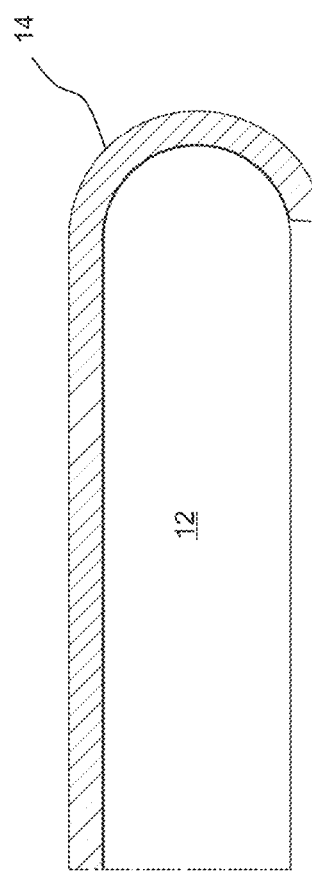
Fig.2A
Fig.2B
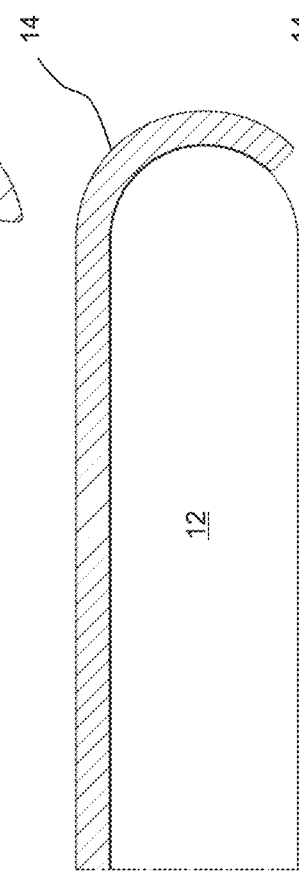
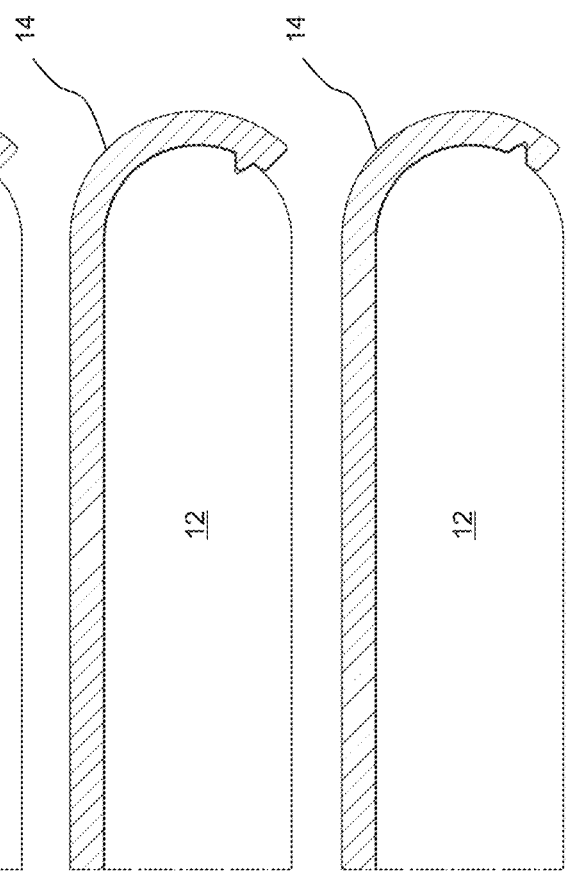
Fig.2C
Fig.2D

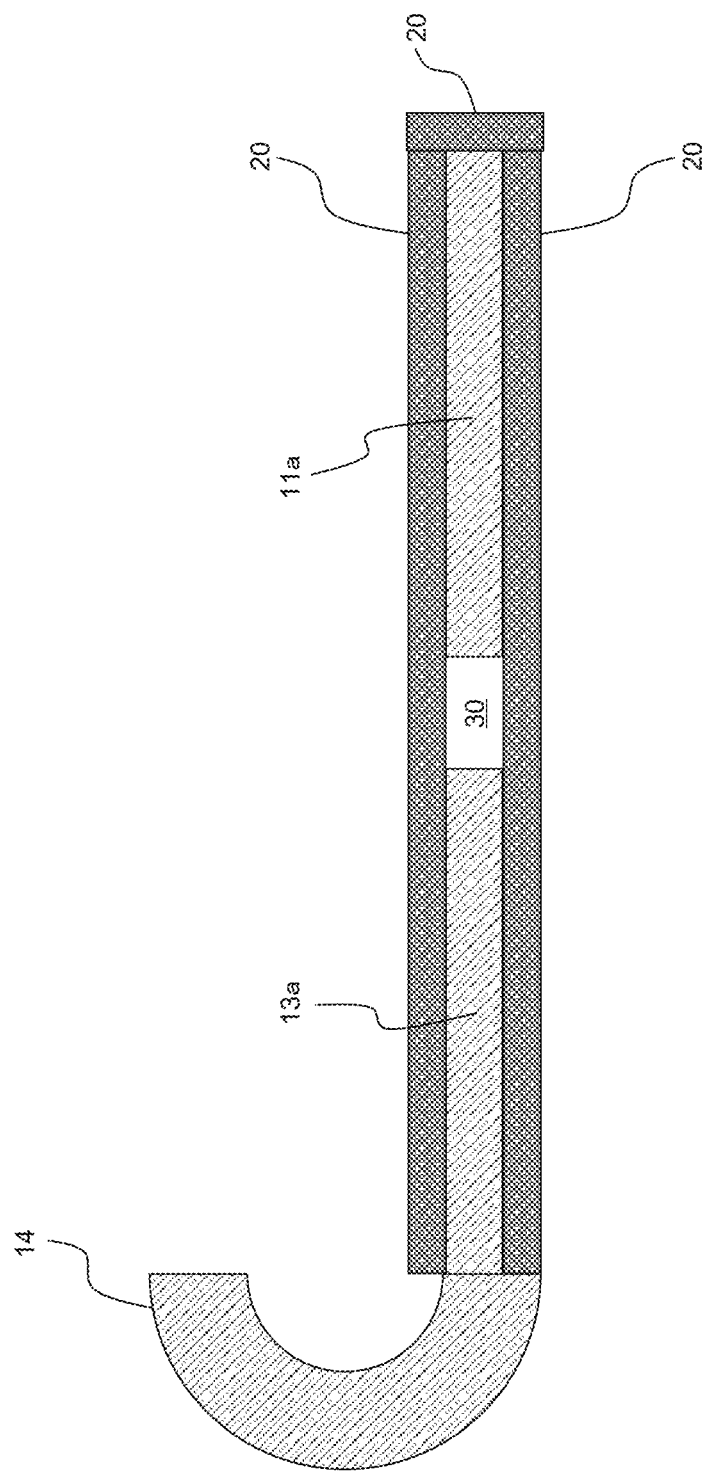

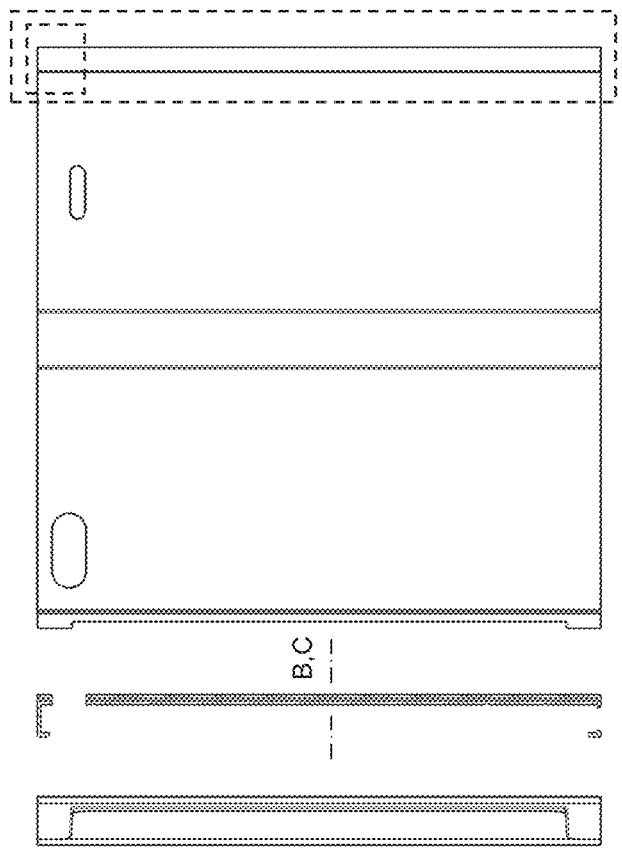
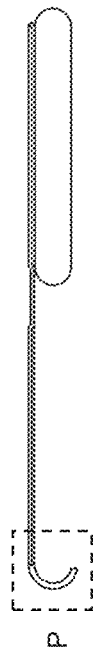
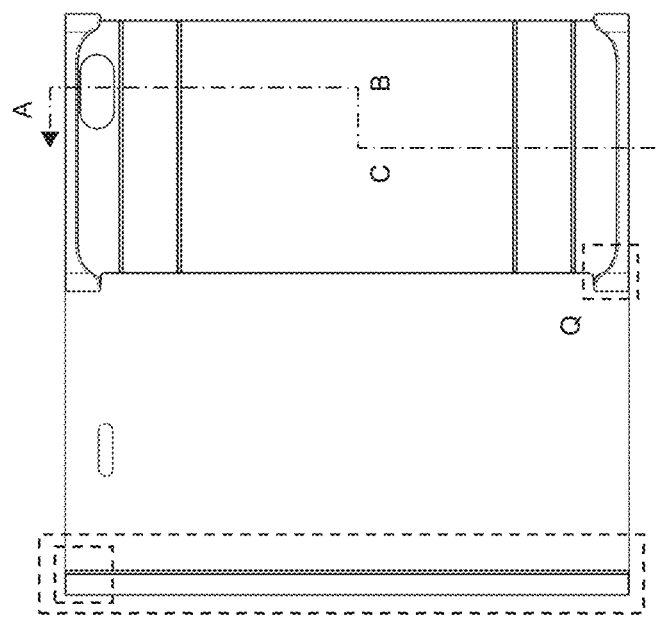

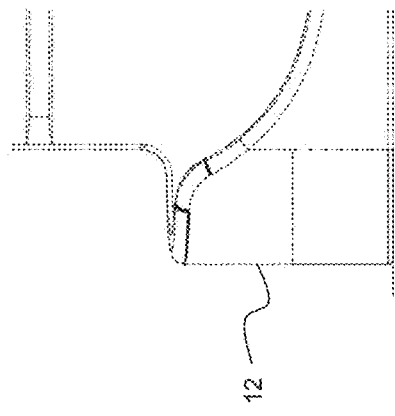
Fig.6B CHARACTERISTIC PORTION IN REGION Q
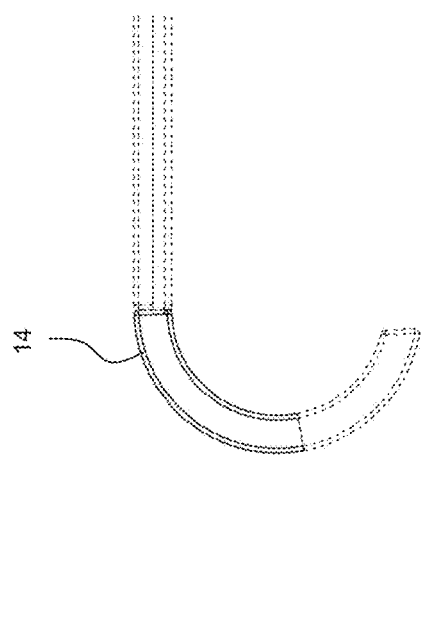
Fig.6A CHARACTERISTIC PORTION IN REGION P
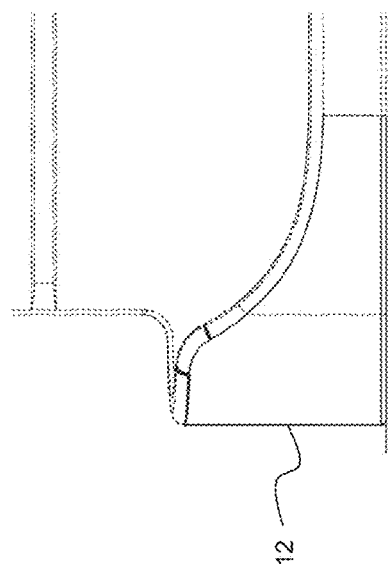
Fig.6C CHARACTERISTIC PORTION IN REGION Q

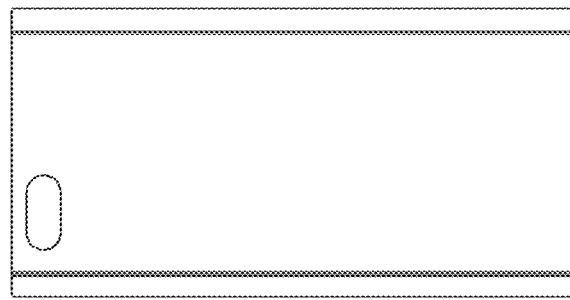
Fig.7G
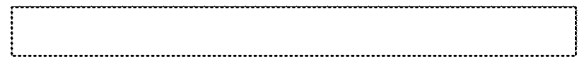
Fig.7D
Fig.7C
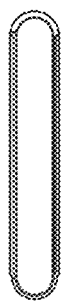
Fig.7E
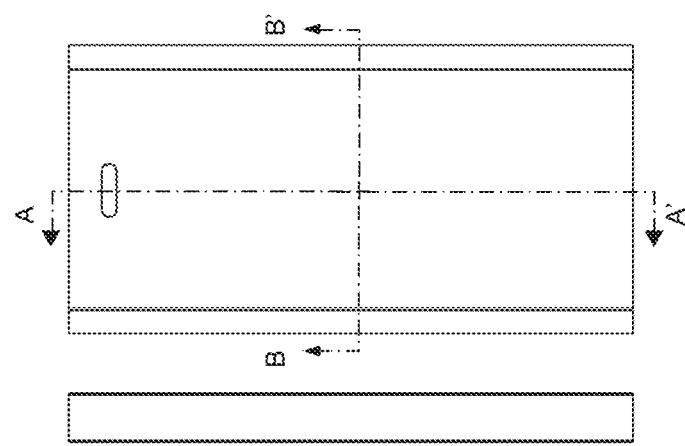
Fig.7A
Fig.7F
Fig.7B

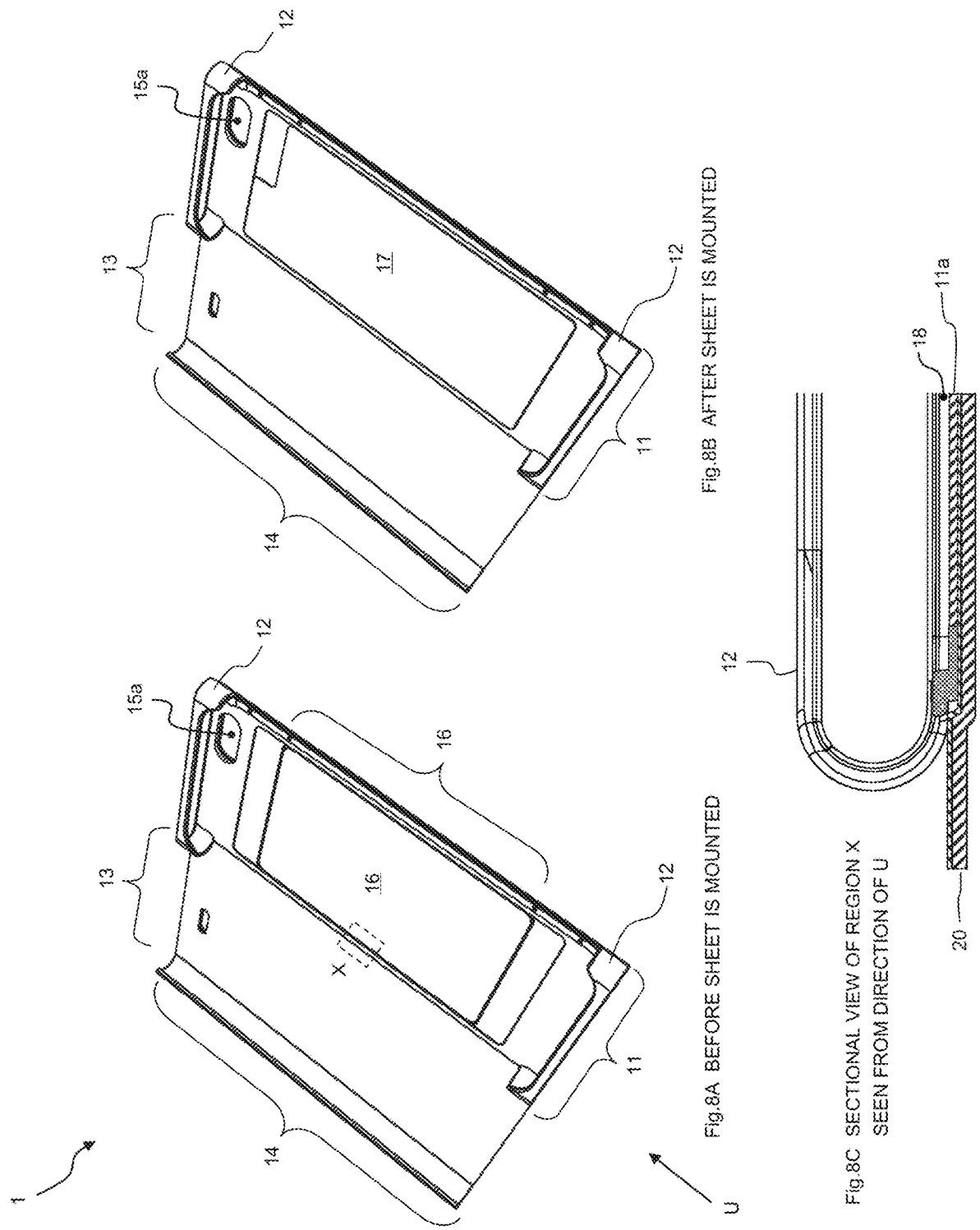

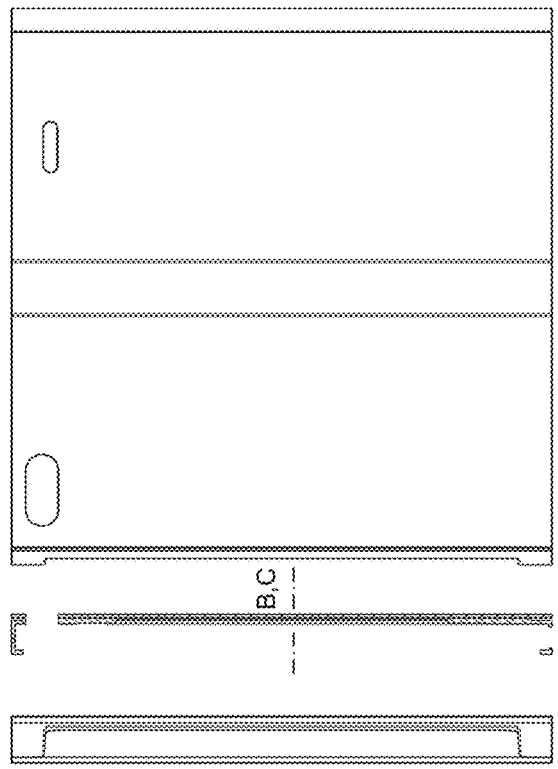
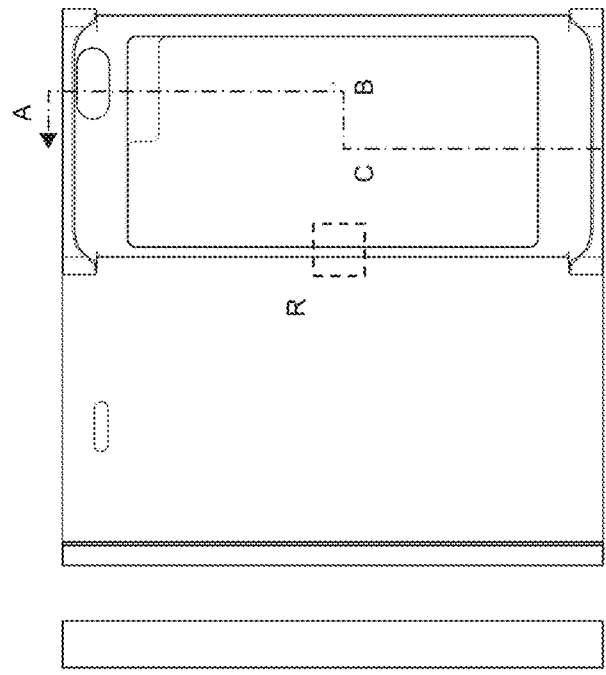
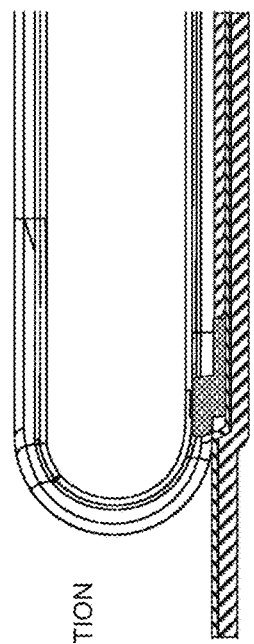
Fig.9G
Fig.9C  Fig.9D
Fig.9E  Fig.9A  Fig.9F  Fig.9B
Fig.9H CHARACTERISTIC PORTION IN REGION R

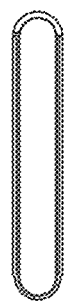
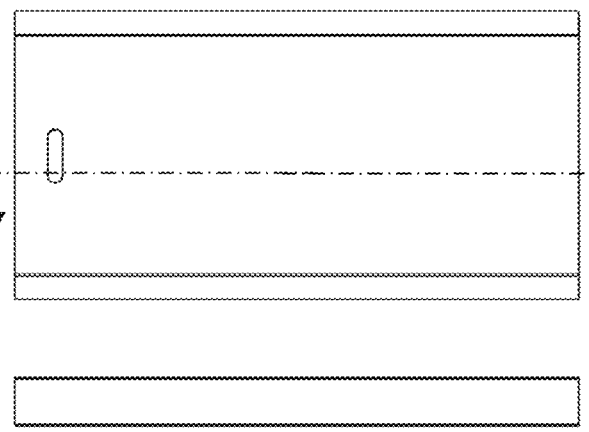
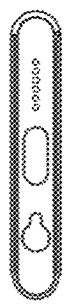
Fig.10E  Fig.10A  Fig.10F
Fig.10B
Fig.10C
Fig.10D
Fig.10G

PROTECTIVE TOOL

TECHNICAL FIELD

The present invention relates to a protector for use with information terminals, including smartphones and tablet terminals.

BACKGROUND ART

Smartphones or tablet terminals are commercially available from various companies, can be intuitively operated using a screen, and are being used by many users due to the high portability thereof.

Many users carry a smartphone or tablet terminal in a pocket or bag, and such a smartphone or tablet terminal is more likely to be damaged. The screen is often broken depending on the conditions.

To protect the screen of a smartphone or tablet terminal, there may be used a notebook case that includes a case that protects the rear surface of a terminal and a flip cover that extends from the case through a side surface of the terminal to the screen thereof to protect the screen.

Patent Literature 1 discloses a case for a portable information terminal wherein the portable information terminal has a flat shape and includes a touchscreen as a front portion thereof; the case includes a case body to which the side surfaces and rear surface of the portable information terminal are fitted and a protection cover on which the case body is mounted; the case body has, on the rear surface thereof, an immovable hook for mounting the case body on the protection cover; the protection cover has, on the inner surface thereof, a catch on which the hook is hung; and in the case body, the hook is disposed such that both ends of the hook are located in positions within ⅙ of the width of the case body from both side surfaces of the case body in a direction perpendicular to the direction in which the hook is hung.

CITATION LIST

Patent Literature

[Patent Literature 1] Japanese Unexamined Patent Application Publication No. 2014-155135

SUMMARY OF THE INVENTION

Technical Problem

The case disclosed in Patent Literature 1 is able to protect the rear surface and screen of the terminal. However, to mount the case body on the protection cover, this case requires the hook, which impairs the appearance and increases the volume. As another method, there is a case where a case body and a protection cover are fastened together using a button. However, this method also increases the volume by the button.

The present invention has been made in view of the foregoing, and an object thereof is to provide a protector for a portable information terminal that protects the rear and front surfaces of the portable information terminal and whose entire volume is small.

Solution to Problem

The present invention provides a protector for protecting a portable information terminal. The protector includes a rear protector configured to protect a rear surface of the portable information terminal, a rear engagement portion disposed on the rear protector and configured to engage with the portable information terminal, a front protector extending from a side surface of the rear protector and configured to protect a front surface of the portable information terminal, and a front engagement portion disposed on the front protector and configured to engage with the rear engagement portion.

The point of the present invention is that the rear engagement portion disposed on the rear protector for protecting the rear surface of the portable information terminal and configured to engage with the portable information terminal and the front engagement portion disposed on the front protector extending from the side surface of the rear protector and configured to protect the front surface of the portable information terminal are engaged with each other. Thus, the rear protector and front protector can be locked together without having to provide an unnecessary mechanism, allowing for an improvement in the appearance and a reduction in the entire volume.

Various embodiments of the present invention are described below. The embodiments below can be combined with each other.

Preferably, the front engagement portion is configured to engage with the rear engagement portion with the front protector protecting the front surface of the portable information terminal.

Preferably, the front engagement portion is bent so as to engage with at least part of a side surface of the rear engagement portion.

Preferably, one of the front engagement portion and the rear engagement portion is provided with a lock protrusion, and the other is provided with a lock groove.

Preferably, the front protector protects the front surface of the portable information terminal through one side surface of the portable information terminal.

Preferably, the front engagement portion is configured to engage with the rear engagement portion on another side surface of the portable information terminal.

Preferably, the rear engagement portion is engaged with four corners of the portable information terminal or at least part of a side surface thereof.

Preferably, a portion corresponding to another side surface of the portable information terminal, of the rear engagement portion is open.

Preferably, a rear plate forming the rear protector and a front plate forming the front protector are covered by a bendable cover.

Preferably, the front engagement portion and the bendable cover are connected to each other without a step in a cross-section of the protector seen from a length direction thereof.

Preferably, the rear protector has a card container to contain a card, on a surface thereof opposed to the portable information terminal.

BRIEF DESCRIPTION OF DRAWINGS

FIG. 1A is a perspective view of a protector 1 according to a first embodiment, and FIG. 1B is a perspective view of a portable information terminal 100.

FIGS. 2A to 2F are drawings showing a state in which a front engagement part 14 is engaged with rear engagement parts 12, in which FIG. 2A is a drawing showing an example of one embodiment; FIG. 2B is a drawing showing a first modification; FIG. 2C is a drawing showing a second modification; FIG. 2D is a drawing showing a third modification; FIG. 2E is a partial enlarged view showing a state in which the front engagement part 14 and rear engagement parts 12 in FIG. 2C are disengaged from each other; and FIG. 2F is a partial enlarged view showing a state in which the front engagement part 14 and rear engagement parts 12 in FIG. 2D are disengaged from each other.

FIGS. 3A to 3F are drawings showing another example of a state in which the front engagement part 14 is engaged with the rear engagement parts 12 and are examples of a sectional view taken along line B-B' in FIG. 7, in which FIG. 3A is a drawing showing an example in which the front engagement part 14 is provided with a protrusion 14a serving as a finger hook; FIG. 3B is a drawing showing an example in which part of an end of the front engagement part 14 is provided with a notched recess 14b and an end wall 14c of the front engagement part 14 serves as a finger hook; FIG. 3C is a drawing showing an example in which the rear engagement parts 12 is provided with notched recesses 12b and an end 14d of the front engagement part 14 serves as a finger hook; FIGS. 3D, 3E, and 3F are partial enlarged views of portions and their vicinities shown by arrows in FIGS. 3A, 3B, and 3C, respectively; and hatched portions in FIGS. 3A to 3F represent end surfaces.

FIG. 4 is a schematic drawing showing an end surface of the protector 1 in FIG. 1A seen from the direction of an arrow U.

FIGS. 5A to 5G are six side views and line A-B-C-D combination end surface view of the protector 1 according to the first embodiment showing a state in which a front protector 13 is open, in which FIG. 5A is a front view; FIG. 5B is a left side view; FIG. 5C is a right side view; FIG. 5D is a line A-B-C-D combination end surface view; FIG. 5E is a plan view; FIG. 5F is a bottom view; FIG. 5G is a rear view; and broken lines in the figures represent characteristic portions of the protector 1 according to the first embodiment.

FIGS. 6A to 6C are drawings showing characteristic portions of the protector 1 according to the first embodiment using solid lines, in which FIG. 6A is a drawing showing a characteristic portion in a region P; FIG. 6B is a drawing showing a characteristic portion in a region Q; and FIG. 6C is a drawing showing a characteristic portion in the region Q.

FIGS. 7A to 7G are six side views and line A-A' end surface view of the protector 1 of the first embodiment in a state in which the front protector 13 is closed, in which FIG. 7A is a front view; FIG. 7B is a left side view; FIG. 7C is a right side view; FIG. 7D is a line A-A' end surface view; FIG. 7E is a plan view; FIG. 5F is a bottom view; and FIG. 7G is a rear view.

FIG. 8A is a perspective view of a protector 1 according to a second embodiment showing a state before a sheet 17 is mounted on a card container 16; FIG. 8B is a perspective view of the protector 1 according to the second embodiment owing a state after the sheet 17 is mounted on the card container 16; and FIG. 8C is a sectional view of a region X in FIG. 8A seen from the direction of an arrow U, in which a hatched portion represents an end surface and a colored portion is a characteristic portion of the second embodiment.

FIGS. 9A to 9H are six side views of the protector 1 of the second embodiment in a state in which a front protector 13 is open, a line A-B-C-D combination end surface view, and a drawing showing a characteristic portion, in which FIG. 9A is a front view; FIG. 9B is a left side view; FIG. 9C is a right side view; FIG. 9D is a line A-B-C-D combination end surface view; FIG. 9E is a plan view; FIG. 9F is a bottom view; FIG. 9G is a rear view; and FIG. 9H is a drawing showing a characteristic portion of the protector 1 according to the second embodiment using a color and is a sectional view of a region R seen from the direction of an arrow Z.

FIGS. 10A to 10G are six side views and line A-A' end surface view of the protector 1 of the second embodiment in a state in which the front protector 13 is closed, in which FIG. 10A is a front view; FIG. 10B is a left side view; FIG. 10C is a right side view; FIG. 10D is a line A-A' end surface view; FIG. 10E is a plan view; FIG. 10F is a bottom view; and FIG. 10G is a rear view.

Figure 3D:
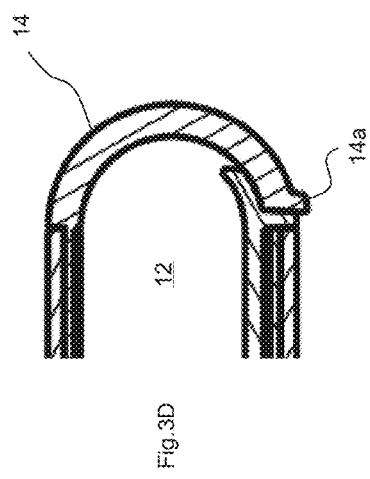

Now, embodiments of the present invention will be described. However, the embodiments below are illustrative only and does not limit the scope of the present invention.
<First Embodiment>

Referring now to FIGS. 1A to 7G, a protector 1 according to a first embodiment of the present invention will be described. Various features described in the embodiments below can be combined with each other. Inventions are established for the respective features.

FIG. 1A is a perspective view of the protector 1 according to the first embodiment, and FIG. 1B is a perspective view of a portable information terminal 100. The portable information terminal 100 is, for example, an iPhone 6 available from. Apple Inc., and the protector 1 protects the rear and front surfaces of the portable information terminal 100. As shown in FIG. 1A, the protector 1 includes a rear protector 11 that protects the rear surface of the portable information terminal 100. The rear protector 11 is provided with two rear engagement parts 12 configured to engage with the portable information terminal 100. The rear engagement parts 12 and portable information terminal 100 may be engaged with each other in any manner. For example, the rear engagement parts 12 and the four corners of the portable information terminal 100 or at least part of a side surface thereof may be engaged with each other. In the first embodiment, the two rear engagement parts 12 are disposed at the top and bottom of the rear protector 11, houses the top and bottom side surfaces of the portable information terminal 100, and are engaged with the four corners of the portable information terminal 100. Thus, the rear protector 11 is mounted on the rear surface of the portable information terminal 100. Portions corresponding to the four corners of the portable information terminal 1001, of the rear engagement parts 12 are right-angled. Thus, the portable information terminal 100 provided with the protector 1 as a whole forms a rectangular parallelepiped and provides a quality appearance like that of a card case.

The protector 1 also includes a front protector 13 that extends from a side surface of the rear protector 11 and protects the front surface of the portable information terminal 100. The front protector 13 protects the front surface of the portable information terminal 100 through one side surface of the portable information terminal 100. In an example shown in FIG. 1A, the left side surface of the portable information terminal 100 corresponds to the one side surface. The front protector 13 is provided with a front engagement part 14 configured to engage with the rear engagement parts 12. The front engagement part 14 is configured to engage with the rear engagement parts 12 with the front protector 13 protecting the front surface of the portable information terminal 100. The front engagement part 14 is also configured to engage with the rear engagement parts 12 on another side surface of the portable information terminal 100. Accordingly, the rear engagement parts 12 engage with the portable information terminal 100, as well as engages with the front engagement part 14. In the example shown in FIG. 1A, the right side surface of the portable information terminal 100 corresponds to the other side surface. In the first embodiment, portions corresponding to the other side surface of the portable information terminal 100, of the rear engagement parts 12 are open. Thus, even when the protector 1 is mounted on the portable information terminal 100, an operation such as a push of a power supply button 105e or the like on the side surface of the portable information. terminal 100 or a slide of a finger from a bend in a side surface of the screen is not hampered.

The rear protectors 11 have openings 15a to 15d. The opening 5a exposes the rear camera of the portable information terminal 100; the opening 15b exposes the earphone jack 105b of the portable information terminal 100; the opening 15c exposes the connector 105c of the portable information terminal 100; and the opening 15d exposes the speaker 105d of the portable information terminal 100. Note that the openings 15 need not have these shapes and may be notches formed at the ends of the rear protectors 11.

FIGS. 2A to 2F are drawings showing states in which the front engagement part 14 according to the first embodiment are engaged with the rear engagement parts 12. FIG. 2A shows an example in which the front engagement part 14 covers most of the side surfaces of the rear engagement parts 12. FIG. 2B shows an example in which the front engagement part 14 covers portions corresponding to 90° or more and less than 180°, of the side surfaces of the rear engagement parts 12. As seen above, in FIGS. 2A and 2B, the front engagement part 14 are bent so as to engage with at least parts of the side surfaces of the rear engagement parts 12. FIG. 2C shows an example in which the front engagement part 14 includes lock protrusions 19a and the rear engagement parts 12 have lock grooves 19b. For details, see FIG. 2E. FIG. 2D shows an example in which the rear engagement parts 12 include lock protrusions 19a and the front engagement part 14 has lock grooves 19b. For details, see FIG. 2F. In examples shown in FIGS. 2C and 2D, the lock protrusions 19a lock into the lock grooves 19b so that the front engagement part 14 and the rear engagement parts 12 can engage with each other strongly. Note that the positions, sizes, shapes, or numbers of the lock protrusions 19a and lock grooves 19b may be any positions or the like.

Figure 3E:
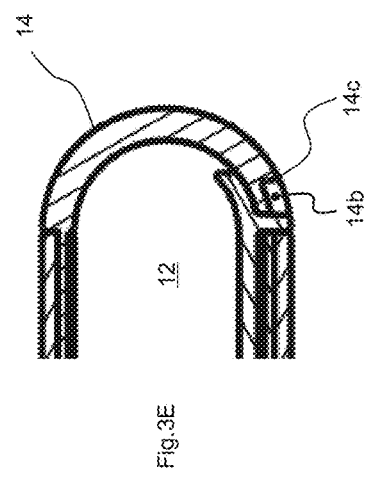
Figure 3F:
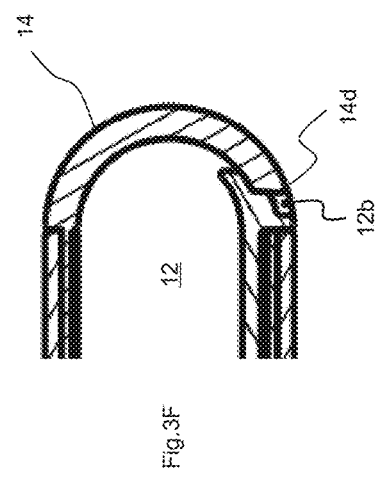
Figure 3A:
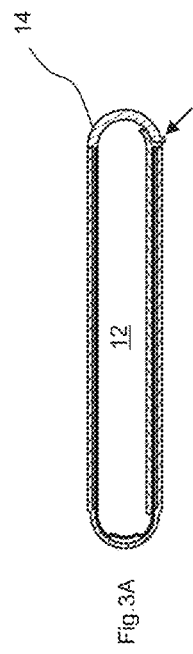
Figure 3B:
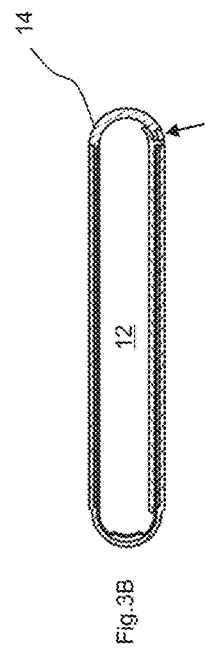
Figure 3C:
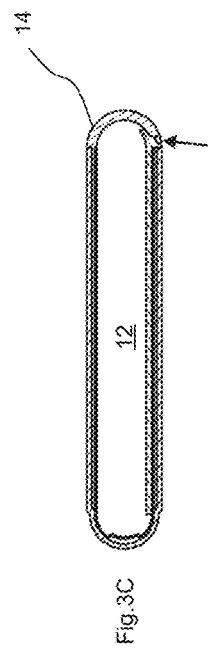

FIGS. 3A to 3F are drawings showing other examples of a state in which the front engagement part 14 according to the first embodiment is engaged with the rear engagement parts 12 and show examples of a sectional view taken along line B-B' in FIG. 7A. Protectors having these shapes are modifications of the protector 1 according to the first embodiment and are provided with finger hooks that allow the front engagement part 14 and rear engagement parts 12 to be easily disengaged from each other. FIG. 3A shows an example in which the front engagement part 14 is provided with a protrusion 14a serving as a finger hook; FIG. 3B shows an example in which part of the end of the front engagement part 14 is provided with a notched recess 14b and an end wall 14c of the front engagement part 14 serves as a finger hook; FIG. 3C shows an example in which the rear engagement parts 12 is provided with a notched recess 12b and an end 14d of the front engagement part 14 serves as a finger hook; and FIGS. 3D, 3E, and 3F are partial enlarged views showing portions and their vicinities shown by arrows in FIGS. 3A, 3B, and 3C, respectively. By providing the front engagement part 14 with the protrusion 14a so that the protrusion 14a serves as a finger hook, as shown in FIGS. 3A and 3E, or providing part of the front engagement part 14 or parts of the rear engagement parts 12 with the recess 14b or recesses 12b so that the end wall 14c or end 14d of the front engagement part 14 serves as a finger hook, as shown in FIGS. 3B and 3E and FIGS. 3C and 3F, the user is allowed to easily disengage the front engagement part 14 and rear engagement parts 12 from each other. The positions, sizes, shapes, or numbers of these finger hooks may be any positions or the like. For example, these finger hooks may be formed over the entire front engagement part 14 or rear engagement parts 12 in the length direction, or may be formed on part thereof in the length direction, or may be formed around the center or at both ends thereof in the length direction or on a portion between both ends.

FIG. 4 is a schematic drawing an end surface of the protector 1 in FIGS. 1A seen from the direction of an arrow U. As shown in FIG. 4 in the protector 1 according to the first embodiment, a rear plate 11a and a front plate 13a are covered by bendable covers with a space 30 between the rear plate 11a and front plate 13a. In the first embodiment, leather covers 20 are used as the bendable covers. The leather covers 20 are formed of, for example, natural leather and may be formed of synthetic leather or fake leather. The rear plate 11a and front plate 13a may be formed of, for example, polycarbonate, plastic, any other resin material, or any other type of material. In the protector 1 according to the first embodiment, the rear plate 11a forms the rear protector 11, and the front plate 13a forms the front protector 13. The front engagement part 14 and leather covers 20 are connected to each other without a step (lower side in FIG. 4). Due to this configuration, the surface (lower side in FIG. 4) of the front protector 13 which is closed is smooth and provides better appearance and operability. This configuration also eliminates the need to perform an edge treatment (sewing) of the top and bottom leather covers 20 and thus improves productivity and reduces cost. Instead of providing the space 30 between the rear plate 11a and front plate 13a, the rear surface plate 11a and front surface plate 13a may be connected using a rotation shaft.

As described above, in the first embodiment, the rear engagement parts 12 of the protector 1 are engaged with the four corners of the portable information terminal 100. Thus, the rear protector 11 can be mounted on the rear surface of the portable information terminal 100. Also, the rear protector 11 and front protector 13 are folded at a portion corresponding to the space 30 (a portion corresponding to the one side surface of the portable information terminal 100). Thus, the front protector 13 is allowed to reach the front surface of the portable information terminal 100 through the one side surface of the portable information terminal 100. As seen above, the front engagement part 14 is engaged with the rear engagement parts 12 on the other side surface of the portable information terminal 100 with the portable information terminal 100 sandwiched between the rear protector 11 and front protector 13, that is, with the front surface of the portable information terminal 100 protected by the front protector 13. Thus, the rear protector 11 and front protector 13 are locked together. Due to this configuration, there is provided the protector 1 that protects the rear and front surfaces of the portable information terminal 100 and whose entire volume is small. Also, the flat surface of the protector 1 is preferable in terms of operability and appearance.

Next, referring to FIGS. 5A to 7G, six side views and end surface view of the protector 1 according to the first embodiment and characteristic portions of the protector 1 according to the first embodiment will be described. FIGS. 5A to 5G are six side views and line A-B-C-D combination end surface view of the protector 1 of the first embodiment in a state in which the front protector 13 is open, in which FIG. 5A is a front view; FIG. 5B is a left side view; FIG. 5C is a right side view; FIG. 5D is a line A-B-C-D combination end surface view; FIG. 5E is a plan view; FIG. 5F is a bottom view; and FIG. 5G is a rear view. Broken lines in the figures show characteristic portions of the protector 1 according to the first embodiment. Among these characteristic portions, a region P and a region Q are particularly characteristic.

FIGS. 6A to 6C are drawings showing the characteristic portions of the protector 1 according to the first embodiment using solid lines, in which FIG. 6A is a drawing showing a characteristic portion in the region P; FIG. 6B is a drawing showing a characteristic portion in the region Q; and FIG. 6C is a drawing showing another characteristic portion in the region Q. As shown in FIG. 6A, a first characteristic of the protector 1 of the first embodiment is that the front engagement part 14 is disposed on the side surface of the front protector 13. A second characteristic thereof is that the front engagement part 14 is disposed over the entire side surface of the front protector 13. A third characteristic of the protector 1 according to the first embodiment is that the corners of the rear engagement parts 12 are approximately right-angled, as shown in FIG. 6B. A fourth characteristic of the protector 1 according to the first embodiment is that the corners of the rear engagement parts 12 are approximately right-angled and are gently curved from above, as shown in FIG. 6C. As used herein, the term "approximately right-angled" refers to having an angle of, for example, 90°, 89°, 88°, 87°, 86°, 85°, 84°, 83°, 82°, 81°, or 80°, or the angle may be between any adjacent two of the values presented.

FIGS. 7A to 7G are six side views and line A-A' end surface view of the protector 1 according to the first embodiment in a state in which the front protector 13 is closed, in which FIG. 7A is a front view; FIG. 7B is a left side view; FIG. 7C is a right side view; FIG. 7D is a line A-A' end surface view, FIG. 7E is a plan view; FIG. 7F is a bottom view; and FIG. 7G is a rear view.

<Second Embodiment>

Next, referring to FIGS. 8A to 10G, a protector 1 according to a second embodiment of the present invention will be described. FIG. 8A is a perspective view showing the state of the protector 1 according to the second embodiment before a sheet 17 is mounted on a card container 16. FIG. 8B is a perspective view showing the state of the protector 1 according to the second embodiment after the sheet 17 is mounted on the card container 16. FIG. 8C is a sectional view of a region X in FIG. 8A seen from the direction of an arrow U. In FIG. 8C, a hatched portion represents an end surface, and a colored portion is a characteristic portion of the second embodiment. Among the reference signs in FIG. 8, the same reference signs as those in FIG. 1 represent the same elements and will not be described.

The protector 1 of the second embodiment differs from the first embodiment that a rear protector 11 includes the card container 16 to contain a card. The card container 16 is disposed on a surface opposed to a portable information terminal 100, of the rear protector 11. Specifically, the card container 16 is formed by making a portion other than the periphery of a rear plate 11a thinner than the periphery of the rear plate 11a. The card is, for example, a card including an IC chip. Specifically, the card is an electronic money card or a card to use public transportation.

As shown in FIG. 8C, a step 18 is formed by making the portion other than the periphery of the rear plate 11a thinner than the periphery of the rear plate 11a. The step 18 forms the card container 16. After a card is contained in the card container 16, the sheet 17 as shown in FIG. 8B is mounted so that the card can be fixed.

As seen above, in the protector 1 according to the second embodiment, the card container 16 is disposed on the rear protector 11. Thus, the user need not take the trouble to take out the wallet or the like when using the card. Also, the user holds the card over a card reader by directing the rear surface of the portable information terminal 100 to the card reader. Thus, the user need not be worried that the display of the portable information terminal 100 may be broken.

Next, referring to FIGS. 9A to 10G, six side views and end surface view of the protector 1 according to the second embodiment and characteristic, portions of the protector 1 according to the second embodiment will be described. FIGS. 9A to 9H are six side views and line A-B-C-D combination end surface view of the protector 1 of the second embodiment in a state in which a front protector 13 is open, in which FIG. 9A is a front view; FIG. 9B is a left side view; FIG. 9C is a right side view; FIG. 9D is a line A-B-C-D combination end surface view; FIG. 9E is a plan view; FIG. 9F is a bottom view; FIG. 9G is a rear view; and FIG. 9H is a drawing showing a characteristic portion of the protector 1 according to the second embodiment using a color and is a sectional view of a region R seen from the direction of an arrow Z. In FIG. 9H, a hatched portion represents an end surface. As seen above, the protector 1 according to the second embodiment is characterized in that the step 18 is formed on a surface opposed to the portable information terminal 100, of the rear plate 11a.

FIGS. 10A to 10G are six side views and line A-A' end surface view of the protector 1 according to the second embodiment in a state in which the front protector 13 is closed, in which FIG. 10A is a front view; FIG. 10B is a left side view; FIG. 10C is a right side view; FIG. 10D is a line A-A' end surface view; FIG. 10E is a plan view; FIG. 10F is a bottom view; and FIG. 10G is a rear view.

While the embodiments of the present invention have been described, the present invention is not limited thereto. Other configurations may be used as long as the rear engagement parts 12 engage with the portable information terminal 100, as well as engage with the front engagement part 14. For example, the four corners of the rear engagement parts 12 may have round shapes according to the shape of the portable information terminal 100. Also, the rear engagement parts 12 may be shaped so as to cover part or all of the other side surface of the portable information terminal 100. Also, instead of holding the four corners of the portable information terminal 100, the rear engagement parts 12 may hold the top and bottom side surfaces or the left and right side surfaces of the portable information terminal 100. In this case, the front protector 13 may be further provided with a member configured to engage with the left and right side surfaces or the top and bottom side surfaces of the portable information terminal 100 so that the member is attached to the portable information terminal 100 when the front protector 13 is closed. Also, all or parts of the rear engagement parts 12 and the front engagement part 14 may be formed of magnets so that the rear engagement parts 12 and front engagement part 14 may be fixed by the magnets. Also, a lock hole may be formed instead of the lock groove 19b, and the rear engagement parts 12 and front engagement part 14 may be fixed by inserting a lock piece 19a into the lock hole. Also, the rear protector 11 and front protector 13 may be formed of different materials. Also, if the rear plate 11a and front plate 13a. are connected using a rotation shaft, the leather cover 20 need not be provided. Also, instead of the leather cover 20, a bendable material may be used.

DESCRIPTION OF REFERENCE SIGNS

1: protector, 11: rear protector, 11a: rear plate, 12: rear engagement part, 12b: recess, 13: front protector, 13a: front plate, 14: front engagement part, 14a: protrusion, 14b: recess, 14c: end wall, 14d: end, 15a to 15d: opening, 16: card container, 17: sheet, 18: step, 19a: lock protrusion, 19b: lock groove, 20: leather cover, 30: space, 100: portable information terminal, 105b: earphone jack, 105c: connector, 105d: speaker, 105e: power supply button

The invention claimed is:

1. A protector for protecting a portable information terminal, comprising:
    a rear protector configured to protect a rear surface of the portable information terminal;
    a rear engagement portion disposed on the rear protector and configured to engage with the portable information terminal;
    a front protector extending from a side surface of the rear protector and configured to protect a front surface of the portable information terminal;
    a front engagement portion disposed on the front protector and configured to engage with the rear engagement portion; and
    a bendable cover connecting the rear protector with the front protector
    wherein the front engagement portion is bent so as to engage with at least part of a side surface of the rear engagement portion,
    a lock protrusion is provided on one of a bent surface of the front engagement portion and the rear engagement portion, and a lock groove is provided on the other of the bent surface of the front engagement portion and the rear engagement portion, and the front protector is capable of being opened and closed by bending the bendable cover.

2. The protector of claim 1, wherein the front engagement portion is configured to engage with the rear engagement portion with the front protector protecting the front surface of the portable information terminal.

3. The protector of claim 1, wherein the front protector protects the front surface of the portable information terminal through one side surface of the portable information terminal.

4. The protector of claim 1, wherein the front engagement portion is configured to engage with the rear engagement portion on another side surface of the portable information terminal.

5. The protector of claim 1, wherein the rear engagement portion is engaged with four corners of the portable information terminal or at least part of a side surface thereof.

6. The protector of claim 1, wherein a portion corresponding to another side surface of the portable information terminal, of the rear engagement portion is open.

7. The protector of claim 1, wherein a rear plate forming the rear protector and a front plate forming the front protector are covered by a bendable cover.

8. The protector of claim 7, wherein the front engagement portion and the bendable cover are connected to each other without a step in a cross-section of the protector seen from a length direction thereof.

9. The protector of claim 1, wherein the rear protector has a card container to contain a card, on a surface thereof opposed to the portable information terminal.

* * * * *